United States Patent
Wolf et al.

(10) Patent No.: US 7,982,333 B2
(45) Date of Patent: Jul. 19, 2011

(54) VOLTAGE REGULATOR HAVING OVERVOLTAGE PROTECTION

(75) Inventors: Gert Wolf, Affalterbach (DE); Reinhard Meyer, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 987 days.

(21) Appl. No.: 11/661,509

(22) PCT Filed: Aug. 10, 2005

(86) PCT No.: PCT/EP2005/053943
§ 371 (c)(1),
(2), (4) Date: Sep. 4, 2007

(87) PCT Pub. No.: WO2006/021511
PCT Pub. Date: Mar. 2, 2006

(65) Prior Publication Data
US 2008/0036431 A1    Feb. 14, 2008

(30) Foreign Application Priority Data
Aug. 27, 2004   (DE) .................. 10 2004 041 511

(51) Int. Cl.
*H02G 3/00* (2006.01)
*H02P 9/00* (2006.01)
(52) U.S. Cl. ................. 307/10.1; 322/25; 361/18
(58) Field of Classification Search ............. 323/267, 323/272, 282; 322/28, 25; 307/10.1, 21, 307/34; 361/91.1, 18
See application file for complete search history.

(56) References Cited

U.S. PATENT DOCUMENTS

| | | | | |
|---|---|---|---|---|
| 3,601,688 | A  * | 8/1971  | Dogadko et al. | 323/246 |
| 6,249,110 | B1 * | 6/2001  | Geyer et al. | 323/272 |
| 6,369,461 | B1 * | 4/2002  | Jungreis et al. | 307/46 |
| 6,608,396 | B2 * | 8/2003  | Downer et al. | 290/40 C |
| 7,221,127 | B2 * | 5/2007  | Masson et al. | 322/28 |
| 2002/0027425 | A1 * | 3/2002 | Asao et al. | 322/28 |
| 2003/0223168 | A1 * | 12/2003 | Ely | 361/91.1 |
| 2005/0048335 | A1 * | 3/2005 | Fields et al. | 429/22 |

FOREIGN PATENT DOCUMENTS

| | | |
|---|---|---|
| DE | 44 39 967 | 5/1996 |
| DE | 198 59 036 | 6/2000 |
| DE | 101 18 846 | 12/2002 |
| DE | 102 62 000 | 2/2004 |
| EP | 0 500 381 | 8/1992 |
| EP | 1013516 | 6/2000 |

* cited by examiner

*Primary Examiner* — Jessica Han
(74) *Attorney, Agent, or Firm* — Kenyon & Kenyon LLP

(57) ABSTRACT

A voltage regulator having overvoltage protection which is situated in a vehicle electrical system between the generator that is situated in a first voltage level and a battery that is situated in a second voltage level. A generator is used as a generator whose control voltage is freely selectable within specifiable limits. The voltage regulator, which is embodied as an in-phase regulator, makes available a regulated voltage on the output side, which is used for supplying the usual vehicle electrical system users as well as for charging the battery. The in-phase regulator is furnished with an electronics system or an intelligence which includes a microprocessor and which evaluates supplied data with regard to voltages, currents or load breakings and which specifies response criteria, and, upon the reaching of certain response criteria, initiates the measures which then become necessary.

26 Claims, 1 Drawing Sheet

VOLTAGE REGULATOR HAVING OVERVOLTAGE PROTECTION

FIELD OF THE INVENTION

The present invention relates to a voltage regulator having overvoltage protection, and more particularly relates to a voltage regulator in a vehicle electrical system which works together with a generator having free voltage.

BACKGROUND INFORMATION

Motor vehicle generators are usually designed in such a way that they satisfy as well as possible the power demands within a certain voltage level, for instance, a voltage level of 14 Volt and a rotary speed population. To do this, the generator is regulated, using a generator regulator, in such a way that the output voltage, that is, in principle, a function of the rotary speed, is held constant over the entire possible rotary speed range. In generators that are designed for a first operating voltage of 14 Volt, for instance, at a second operating voltage that is higher than the first operating voltage, greater power could be attained at a clearly improved efficiency. The so-called turn-on rotary speed, that is the rotary speed beginning at which the generator is able to give off power, also increases, however, with increasing operating voltage.

German Patent Application No. DE OS 198 59 036 describes a vehicle electrical system for a motor vehicle, in which a generator is used whose output voltage is modifiable, and is freely selectable, for example, to lie between 14 Volt and 42 Volt. In this context, the generator is connected via an in-phase regulator to the vehicle electrical system, which requires a constant voltage of 14 Volts, for instance. The battery, having the nominal voltage of 12 Volts, which is to be charged with approximately 14 Volts, also belongs to this vehicle electrical system. Users which can also be operated using a higher voltage than 14 Volts, for instance, an electrical heating system, an engine radiator fan, etc., are operated at a variable voltage of 14 Volts to 42 Volts.

A generator, which is usually designed as a three-phase generator, is generally able to generate overvoltages when loads are suddenly switched off. That is why it is customary to provide a generator, that is located in the vehicle electrical system, with a so-called load dump protector which, for example, includes Zener diodes, and reduces the effect of overvoltages, and prevents the overvoltages from leading to damage. An example of a generator having Zener diodes is described in German Patent Application No. DE-OS 101 18 846.

In a multi-voltage onboard electrical system in which the generator is operated at free voltage, if users are suddenly switched off, this can lead to a large voltage pulse which, for example, at an operation at 42 Volts, could lead to the destruction of the Zener diodes. Zener diodes in current load dumping protective circuits are designed for power in the forward direction, and are therefore only able to take on a part of the load dumping current without being damaged themselves. In a complete load breaking at a generator operation in the higher voltage range, damage to the Zener diodes would be probable.

Therefore, in German Patent Application No. DE-OS 101 18 846, in connection with a multi-voltage onboard electrical system, a special interconnection of Zener diodes is described in which, in the load dumping case, the Zener diodes are operated at least partially at their breakdown, that is, in backward operation. In this instance, the limitation of the voltage is determined mainly by the Zener voltage of those diodes that are being operated in backward operation.

An alternative to, or refinement of the conventional design described above, could be to obtain larger diode chip areas by using larger diodes or by the parallel connecting of several diodes, or by using a load dump-protective unit that includes high blocking diodes. Voltage-sensitive users could be switched off by a load management if a load dump is threatening to occur. Similarly, as of the attainment of a voltage threshold, voltage-sensitive users could be selectively switched in.

SUMMARY

It is an object of the present invention to attenuate voltage peaks that occur in response to the sudden switching off of heavy electrical users (load dump), especially in a multi-voltage onboard electrical system having at least two voltage levels, in which no battery is present on the side having the free, that is, the higher voltage, or fully to compensate for the voltage peak, and thus to obtain load dump protection. The free voltage is regulated, according to the requirements of the users, between a first voltage level $U_{G1min}$ of, for instance, 14 Volts and a second (upper) voltage level $U_{G1max}$ of, for instance, 42 Volts, to a specifiable setpoint voltage value $U_{GFsetpoint}$, for which the following equation holds:

$$U_{G1min} <= U_{GFsetpoint} <= U_{G1max}$$

The height of the voltage can be specified, for example, by a control unit or preferably by the voltage regulator (DC/DC converter) or by the in-phase regulator, etc. Load dump protection may be attained, for example, by a voltage regulator, preferably an in-phase regulator described herein.

An advantage of the present invention is that it may cost-effectively limit the load dump energy in the vehicle electrical system, appearing in response to the sudden switching off of large users, without additional interconnection expenditure, and may avoid or reduce impending damage at overvoltage protection circuits, for instance, Zener diodes or other vehicle electrical system components, such as generator regulators, load regulators, voltage regulators, control units, etc. In this context, it may be advantageous if, specifically the load dump energy of the free voltage vehicle electrical system can also be reliably limited.

These advantages may be achieved, for example, by inserting a special voltage regulator, especially an in-phase regulator, which includes prerequisite conditions that make it possible to trigger certain switching processes, between the generator and the part of the vehicle electrical system that is constructed using the usual vehicle electrical system components in 14 Volt technology and which requires regulated fixed voltage because of the use of 12 Volt lead batteries. The voltage regulator, in an advantageous manner, has an electronic system for this, and, in an advantageous manner, a microprocessor which triggers switching processes at certain specifiable response criteria.

In accordance with an embodiment of the present invention, the response criteria may be fixed both for the side of the vehicle electrical system that is operated at free voltage and the side operated at regulated voltage. Advantageous response criteria for the voltage regulator are:

The exceeding of a set voltage threshold on the side using free regulated voltage, The exceeding of certain rates of rise of applied forward voltage or voltage modifications, may give a warning of load shedding by an appropriate control unit.

After the fulfillment of one of the response criteria, certain measures are initiated, in an especially advantageous manner, which increase the energy reduction on the side having free regulated voltage. In this context, for example, the voltage is increased by a specifiable value which is selected in such a way that no negative effects on the low voltage users appear. The load dump energy that arises can then be reduced because of the current on the low voltage side, which is then higher.

When no response criterion for the voltage regulator is fulfilled any longer, the voltage on the low voltage side is advantageously reduced again and adjusted to requirements that are then in existence.

BRIEF DESCRIPTION OF THE DRAWING

The FIGURE shows a basic representation of a vehicle electrical system having two voltage levels and having a voltage regulator situated between them.

The function of an example embodiment of the present invention will be described in greater detail below, with the aid of the FIGURE.

DETAILED DESCRIPTION OF EXAMPLE EMBODIMENTS

Figure 1:
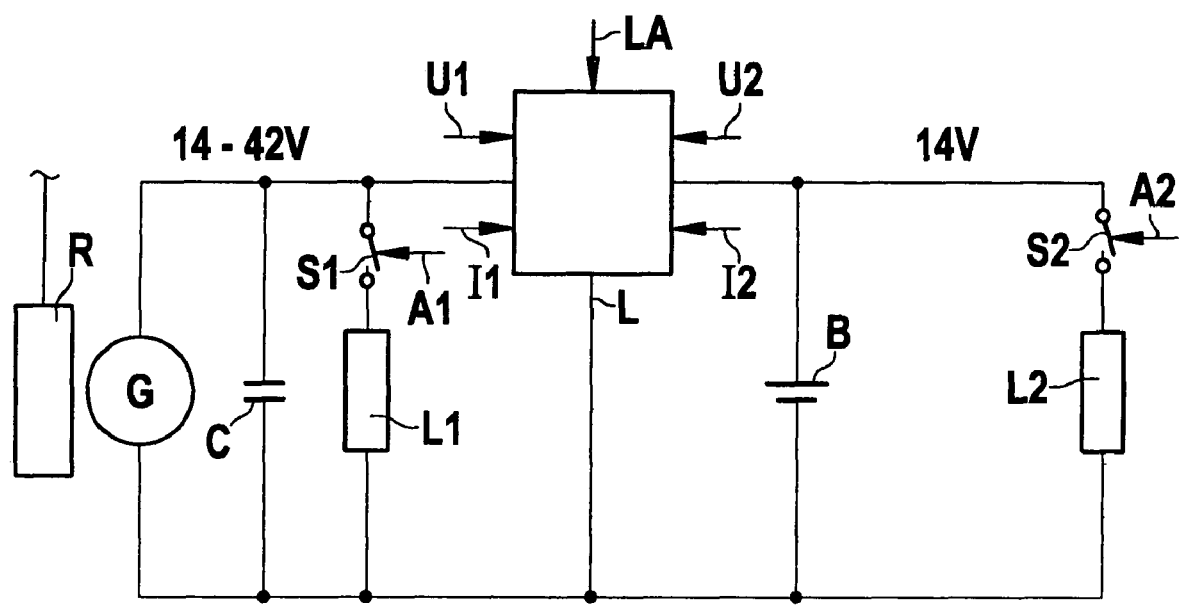

The FIGURE shows a basic representation of a vehicle electrical system having two different voltage levels. The two voltage levels are, for instance, a 14 Volts level having a regulated voltage and a voltage level having a regulated voltage between two voltage levels of, for instance, 14 Volts and 42 Volts. The generation of electrical energy takes place with the aid of a generator G regulated using a generator regulator R, whose control voltage is freely selectable between two voltage levels, for example, between 14 Volts and 42 Volts. The control voltage specification preferably takes place by a control unit or, for instance, by the voltage regulator itself or by an in-phase regulator etc., DC voltage converter (DC/DC converter) via an analog or digital interface between the generator regulator and the control unit or the voltage regulator.

Connected to generator G is a load L1, which includes all the users that can be supplied with variable voltage. These users include, for example, an electrical heater system, a radiator fan, as well as additional users that are voltage insensitive and which should be operated at as high a voltage as possible, or rather, whose output power should be regulated by specifying the voltage level. Switching in these users L1 takes place as usual by the operation of an associated switch, designated in the basic representation as S1. The activation of individual switches S1 is able to take place using suitable activation signals A1 from voltage regulator L. For the stabilization of the free voltage side, a capacitor may be connected in parallel to generator G, preferably a double layer capacitor.

Generator G, or rather the voltage level, having free voltage and lying on the generator side, is connected to the second voltage level via a voltage regulator L. Generator G feeds voltage regulator L, in this instance, with a voltage amounting to between 14 Volt and 42 Volt. The voltage level that has a regulated voltage of, for instance, 14 Volt also includes load L2, besides vehicle battery B, that is usually a lead battery. Load L2 includes all electrical users that are supposed to be supplied with a regulated voltage. In turn, the users can be switched on and off by a respectively assigned switch S2, for instance, by the application of activating signals A2, that are able to be generated by voltage regulator L.

The voltage regulator, in particular an in-phase regulator L, is, for example, an electronic regulator that is furnished with an intelligence which may include a microprocessor, and which forms activating signals A1, A2 and perhaps more, from data supplied to it or captured by itself. These data are, for instance, the two actual voltage values U1, U2 on the primary or the secondary side of the vehicle electrical system. These actual voltage values U1, U2 are recorded by the in-phase regulator itself, or are ascertained using suitable voltmeters not shown in the drawing, and are supplied to the in-phase regulator. Additional variables that are able to be recorded by the in-phase regulator or supplied to the in-phase regulator are currents measured at specifiable locations. For example, currents I1 and I2 are named which are measured at selectable locations in the two voltage levels. Additional information that can be supplied to in-phase regulator L is the load shedding warned about by an additional control unit that is designated by LA.

Thus, voltage regulator L has both a voltage recording capability in the 14 Volt vehicle electrical system and a voltage recording in the 42 Volt vehicle electrical system, and in addition it has at least one current recording capability. From these variables, which have to be present in the in-phase regulator so that its maximum power input is not exceeded, the overvoltage protection according to the present invention can also be implemented for a voltage regulating system, shown in the FIGURE, for a vehicle electrical system having voltage regulator L. The problems arising in such a vehicle electrical system can be reliably avoided, in this instance. Voltage regulator L specifies the voltage level in the 42 Volt vehicle electrical system, in this instance. If this is exceeded by a certain delta, or if a fixed voltage value of, for example, 50 V is exceeded, the regulator reacts in the manner described below.

When there is a load dump, that is, when there is a sudden switching off of a high current user, for instance, electrical heating in the 14-42 Volt vehicle electrical system, high voltage peaks can occur, since no battery is available for attenuation in this vehicle electrical system range between the generator and the in-phase regulator. Because of this, without taking additional measures, damage is possible to the vehicle electrical system components. This applies to generator regulators, rectifier diodes, load regulators, in-phase regulators, control units, and so forth. In order clearly to attenuate, or compensate for the effects of the load dump, one may proceed as follows with the aid of a suitable regulator:

1. Definition of Response Criteria

One or more response criteria are defined for the voltage regulator. Such criteria are, for example, the exceeding of a set voltage threshold such as 50 Volts on the vehicle electrical system side having the free voltage, the exceeding of certain rates of rise of applied forward voltage, or the warning of a load shedding or load breaking LA by an appropriate further control unit. If one of these response criteria is detected by voltage regulator L, it has to undertake corresponding activations and, for instance, output at least one of activating signals A1 and/or A2.

2. Regulation on the Low Voltage Side

Upon the fulfillment of a response criterion, voltage regulator L should, according to paragraph 1., increase the voltage situation on the 14 Volt side, for instance, by 0.5 Volts, from 13.5 Volts to 14 Volts. By doing this, a larger current is transferred via voltage regulator L into the 14 Volt vehicle electrical system, and a part of the load dump energy is reduced.

3. Restoration of the Normal 14 Volt Voltage

After voltage regulator L detects from the data supplied to it or ascertained by it, that there is no further response criterion, the voltage is reduced again to the original value in the 14 Volt vehicle electrical system or the corresponding voltage level.

Using this procedure, the load dump energy of the free voltage vehicle electrical system can be limited cost-effectively, without additional interconnection expenditure, by transferring this energy to the 14 Volt side. This makes it possible to avoid or reduce impending damage of the Zener diodes as well as other vehicle electrical system components.

Depending on the embodiment of the present invention, voltage regulator L, such as an in-phase regulator, can be executed as a low-loss buck chopper, which carries out a voltage conversion from high to low, or as a low-loss boost chopper, which boosts low voltages.

The present invention may be used, for example, in vehicle electrical systems having the following special conditions:

On the input side, on the side of voltage regulator L facing generator G, the voltage should be in a range of $U_{G1min}$=14 Volt to $U_{G1max}$=42 Volt, and the output side voltage level should be in the area of 14 Volt. Or, on the input side it should be 28 Volt to 42 Volt and on the output side, 28 Volt. Or, on the input side 14 Volt and on the output side 42 Volt. The free voltage can be regulated, according to the requirements of the users, between a first voltage level $U_{G1min}$ of, for instance, 14 Volt and a second (upper) voltage level $U_{G1max}$ of, for instance, 42 Volt, to a specifiable setpoint voltage value $U_{GFsetpoint}$, for which the following equation applies:

$$U_{G1min} <= U_{GFsetpoint} <= U_{G1max},$$

the height of the voltage being able to be specified by a control unit or the voltage regulator.

The following context applies to the reference numerals or the symbols used:

G: generator having free regulated voltage
R: generator regulator having a digital or analog interface for voltage specification
L: voltage regulator, preferably an in-phase regulator
L1: combination of all loads that are able to be operated using variable voltage
S1: combination of all switches that switch loads using variable voltage
U1: free voltage
I1: current of the free voltage side in the voltage regulator
A1: activating signals for S1
C: optional capacitor, preferably two layer capacitor
B: 12 Volt or 28 Volt battery
L2: combination of all loads that are operated using constant voltage
S2: combination of all switches that switch loads using constant voltage
U2: regulated, preferably constant voltage
I2: current from the voltage regulator on the side regulated to constant voltage
A2: activating signals for S2
LA: signal that warns of load breaking and, for instance, comes from another control unit.

What is claimed is:

1. A voltage regulator having overvoltage protection in a vehicle electrical system including at least two voltage levels, comprising:
a voltage regulator arrangement inserted between the two voltage levels and being connected to a generator and a load that is directly connectable to the generator on an input side and to a battery as at least one load on an output side, the voltage regulator arrangement providing a regulated voltage on the output side, the voltage regulator arrangement including an electronic system that defines specifiable response criteria and checks whether the response criteria have been reached;
wherein the electronic system is adapted to change its regulating characteristics and undertake an increase in the voltage on the output side when at least one response criterion has been reached.

2. The voltage regulator as recited in claim 1, wherein the voltage regulator is an in-phase regulator.

3. The voltage regulator as recited in claim 2, wherein an exceeding of certain rates of rise of applied forward voltage on a free voltage side is specified as the response criterion for the in-phase regulator.

4. The voltage regulator as recited in claim 2, wherein a warning of a load breaking or a load shedding by an appropriate control unit is specified as the response criterion for the in-phase regulator.

5. The voltage regulator as recited in claim 2, wherein the voltage is increased by approximately a ½ Volt on the output side of the in-phase regulator.

6. The voltage regulator as recited in claim 2, wherein after no response criterion is any longer present, the output voltage on the output side of the in-phase regulator is reduced again to a normal value.

7. The voltage regulator as recited in claim 2, wherein the in-phase regulator gives off activating signals which open or close specifiable switches, and thereby switch in or off appertaining users when the criteria have been fulfilled.

8. The voltage regulator as recited in claim 1, wherein the voltage regulator is a low-loss buck chopper.

9. The voltage regulator as recited in claim 1, wherein the voltage regulator is designed as a low-loss boost chopper.

10. The voltage regulator as recited in claim 1, wherein an exceeding of a set voltage threshold on a free voltage side is specified as the response criterion for the regulator.

11. The voltage regulator as recited in claim 1, wherein the voltage on the output side is increased until the voltage on the input side has again fallen below a specifiable value of 45 Volts.

12. The voltage regulator as recited in claim 1, wherein a specifiable maximum voltage on the output side is not undershot.

13. The voltage regulator as recited in claim 12, wherein the maximum voltage is 16.0 volts.

14. The voltage regulator as recited in claim 1, wherein a voltage level on the input side is in a range of 14-42 Volts, and a voltage level present on the output side is approximately 14 Volts.

15. The voltage regulator as recited in claim 1, wherein a voltage level on the input side is in a range of 28-42 Volts, and a voltage level on the output side is approximately 28 Volts.

16. The voltage regulator as recited in claim 1, wherein a voltage level present on the input side is approximately 14 Volts, and a voltage level present on the output side is approximately 42 Volts.

17. The voltage regulator as recited in claim 1, wherein the voltage regulator is an in-phase regulator, wherein an exceeding of a set voltage threshold on a free voltage side is specified as the response criterion for the regulator, wherein an exceeding of certain rates of rise of applied forward voltage on a free voltage side is specified as the response criterion for the in-phase regulator, and wherein a warning of a load breaking or a load shedding by an appropriate control unit is specified as the response criterion for the in-phase regulator.

18. The voltage regulator as recited in claim 17, wherein the voltage is increased by approximately a ½ Volt on the output side of the in-phase regulator, wherein the voltage on the output side is increased until the voltage on the input side has again fallen below a specifiable value of 45 Volts, wherein a specifiable maximum voltage on the output side is not undershot.

19. The voltage regulator as recited in claim 17, wherein after no response criterion is any longer present, the output voltage on the output side of the in-phase regulator is reduced again to a normal value, wherein the in-phase regulator gives off activating signals which open or close specifiable switches, and thereby switch in or off appertaining users when the criteria have been fulfilled.

20. The voltage regulator as recited in claim 1, wherein the voltage regulator is a low-loss buck chopper, wherein an exceeding of a set voltage threshold on a free voltage side is specified as the response criterion for the regulator, wherein an exceeding of certain rates of rise of applied forward voltage on a free voltage side is specified as the response criterion for the in-phase regulator, and wherein a warning of a load breaking or a load shedding by an appropriate control unit is specified as the response criterion for the in-phase regulator.

21. The voltage regulator as recited in claim 20, wherein the voltage is increased by approximately a ½ Volt on the output side of the in-phase regulator, wherein the voltage on the output side is increased until the voltage on the input side has again fallen below a specifiable value of 45 Volts, wherein a specifiable maximum voltage on the output side is not undershot.

22. The voltage regulator as recited in claim 20, wherein after no response criterion is any longer present, the output voltage on the output side of the in-phase regulator is reduced again to a normal value, wherein the in-phase regulator gives off activating signals which open or close specifiable switches, and thereby switch in or off appertaining users when the criteria have been fulfilled.

23. The voltage regulator as recited in claim 1, wherein the voltage regulator is designed as a low-loss boost chopper, wherein an exceeding of a set voltage threshold on a free voltage side is specified as the response criterion for the regulator, wherein an exceeding of certain rates of rise of applied forward voltage on a free voltage side is specified as the response criterion for the in-phase regulator, and wherein a warning of a load breaking or a load shedding by an appropriate control unit is specified as the response criterion for the in-phase regulator.

24. The voltage regulator as recited in claim 23, wherein the voltage is increased by approximately a ½ Volt on the output side of the in-phase regulator, wherein the voltage on the output side is increased until the voltage on the input side has again fallen below a specifiable value of 45 Volts, wherein a specifiable maximum voltage on the output side is not undershot.

25. The voltage regulator as recited in claim 23, wherein after no response criterion is any longer present, the output voltage on the output side of the in-phase regulator is reduced again to a normal value, wherein the in-phase regulator gives off activating signals which open or close specifiable switches, and thereby switch in or off appertaining users when the criteria have been fulfilled.

26. A vehicle electrical system, comprising:
   at least one generator;
   a load that is able to be directly connected to the generator;
   a battery and a load that is able to be directly connected to the battery; and
   a voltage regulator lying between the generator and the battery, the voltage regulator having overvoltage protection, being inserted between two voltage levels, and being connected to the generator on an input side and to the battery as at least one load on an output side, the voltage regulator being designed so that it gives off a regulated voltage on the output side, the voltage regulator including an electronic system that defines specifiable response criteria and checks whether the response criteria have been reached, wherein the electronic system adapted to change its regulating characteristics and undertake an increase in the voltage on the output side when at least one response criterion has been reached.

* * * * *